Sept. 1, 1942.    J. B. VAN DER WERFF    2,294,702
BALANCED HYDRAULIC VALVE
Filed April 18, 1941
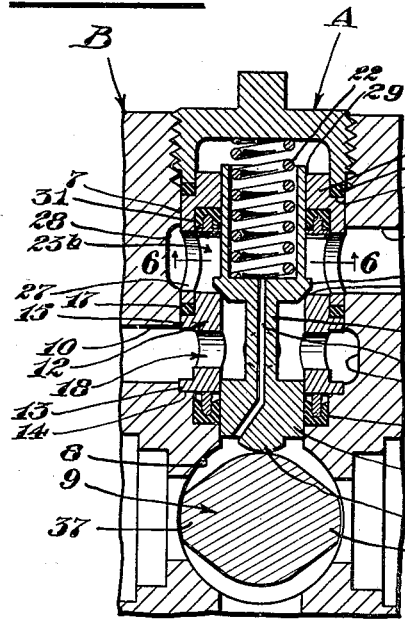
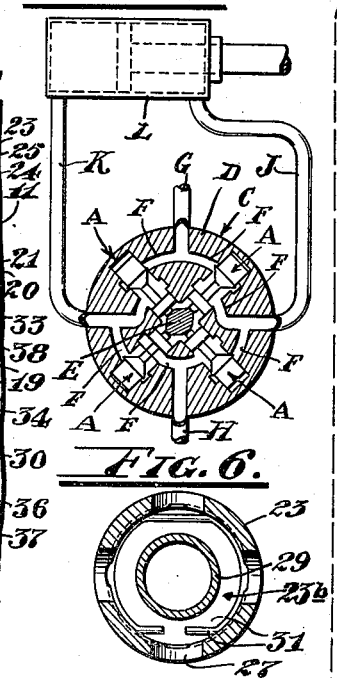
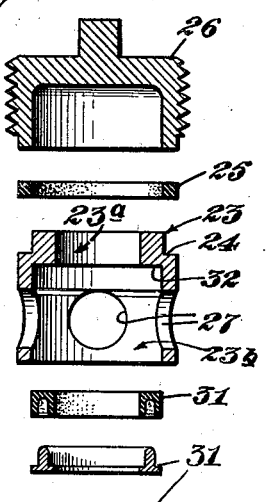
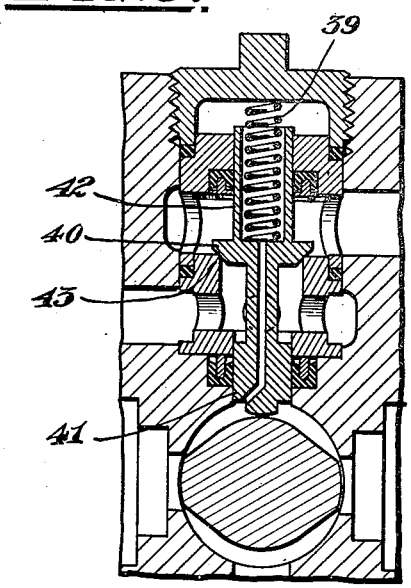
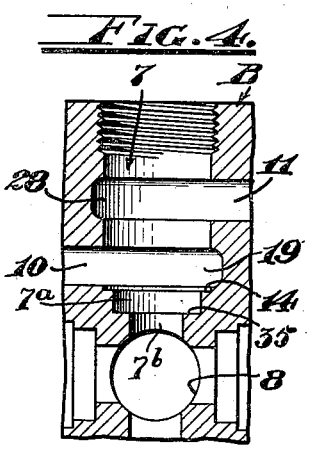
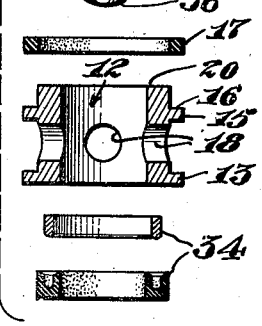
Inventor
Jacob B. Van Der Werff
By R. S. Berry
Attorney Patented Sept. 1, 1942

2,294,702

UNITED STATES PATENT OFFICE 2,294,702

BALANCED HYDRAULIC VALVE

Jacob B. Van Der Werff, Pasadena, Calif., assignor to Adel Precision Products Corp., a corporation of California Application April 18, 1941, Serial No. 389,121

12 Claims. (Cl. 251—132)

This invention relates to improvements in hydraulic valves, particularly the type used for controlling hydraulically operated mechanisms of airplanes, and has for an object the provision of a novel and highly efficient poppet valve which is hydraulically balanced to reduce the high pressure load on the operating handle and the pressure drop in the system controlled by one or more such valves.

Another object of the invention is to produce a hydraulic poppet valve which readily lends itself to a fully balanced arrangement in which a spring is entirely depended upon to seat the valve member, or to a slightly unbalanced arrangement in which hydraulic pressure assists in seating the valve member; there being in either case an advantageous reduction in the handle loads and the pressure drops which are found to be detrimental in the ordinary pressure seated poppet valve. Thus, it is to be understood that by the term "balanced" as herein used I mean a valve embodying either of the aforesaid arrangements.

A further object of my invention is to provide a simply constructed valve unit of the character described which may be produced without costly machining and custom fitting of its parts and may be quickly and easily installed and removed and the parts thereof readily interchanged.

Another object of my invention is to provide a balanced valve of the character described which is guided at both ends by the means for effecting the hydraulic balance thereof.

Another object is to provide a balanced valve unit such as described having a novel arrangement of a cylindrical seat member and a cylindrical sleeve which not only effectively seal the valve in its bore but act as cylinders for piston-like balancing members on opposite ends of the valve.

Another purpose of my invention is to provide a balanced poppet valve unit such as described which is especially adapted to be used in 4-way hydraulic control valves due to its provision for reducing handle loads and pressure drops and also controlling axially spaced ports in the bore thereof in a manner conducive to compactness of assembly, simplicity in the arrangement of the fluid passages in the valve body and the use of a cast valve body, having cored passageways and requiring little or no costly machining.

With the foregoing objects in view, together with such other objects and advantages as may subsequently appear, the invention is carried into effect as illustrated by way of example in the accompanying drawing, in which:

Fig. 1 is a vertical sectional view of a balanced poppet valve embodying my invention;

Fig. 2 is a composite view of parts of the valve assembly shown in section and elevation, and in the order of installation;

Fig. 3 is a schematic view showing four of my balanced valves as when embodied in a 4-way unit for controlling a hydraulic jack;

Fig. 4 is a vertical sectional view of the valve body with the valve assembly removed;

Fig. 5 is a vertical sectional view similar to Fig. 1 showing the valve unit as when slightly unbalanced whereby the hydraulic pressure will assist the spring in seating the valve;

Fig. 6 is a cross sectional view taken on the line 6—6 of Fig. 1.

Referring to the drawing more specifically, it is seen that the embodiments of my invention shown include a valve assembly A contained in a valve body B having a valve assembly receiving bore 7 opening into a cam shaft bore 8. The bores 7 and 8 are cylindrical and extend perpendicular to each other. A cam shaft 9 is operable in the bore 8 to actuate the valve to control the flow of fluid relative to passages 10 and 11 which communicate with axially spaced points in the valve bore. In forming the bore 7 it is provided with an outer portion of uniform diameter internally threaded at its outer end and extending into the valve body B to a point past but proximate to the innermost passage 10 where it terminates in an annular shoulder 14. An intermediate portion of the bore 7 is formed of reduced diameter leading inwardly from the shoulder 14 as indicated at 7a which reduced portion terminates in an annular shoulder 35, and from such intermediate portion of the bore leads the inner end portion 7b of the bore 7 opening to the cam shaft receiving bore 8.

The valve assembly A includes a tubular open ended seat member 12 mounted in the inner end of the bore 7 and provided with an annular flange 13 at its inner end adapted to seat on the annular shoulder 14 in said bore. The peripherial face of the flange 13 engages the cylindrical wall of the bore 7. A similar flange 15 is formed adjacent the outer end of the seat member 12 and has its peripherial face also engaged with the cylindrical wall of the bore 7 so, that an annular recess 16 is defined for reception of a sealing ring 17 and its positioning on the flange 15.

Between the flanges 13 and 15 are ports 18 which register with an annular enlargement 19 of the bore 7, the passage 10 opening into said enlargement whereby an ample and unrestricted flow of fluid through the ports and said passages will be afforded.

The outer end of seat member 12 defines an annular valve seat 20 for an outwardly opening valve member 21 urged toward its seat by means of a spring 22.

A sleeve 23 is fitted in the bore 7 so that its inner end telescopes the outer end of the seat member 12 and lies in the recess 16 against the washer 17. The outer end of the sleeve is reduced to define an annular shoulder 24 against which a sealing ring 25 is engaged. An externally screw threaded flanged cap 26 is screwed into the outer end of the bore 7 so that its inner end telescopes the reduced end of the sleeve and abuts the sealing ring 25 whereby to hold the seat member sleeve and other parts assembled in the bore. On removal of this cap the valve parts, or in fact the valve assembly may be readily removed and likewise installed without custom fitting of individual parts.

The sleeve 23 is formed between its ends with ports 27 registering with an annular enlargement 28 of the bore 7 which enlargement surrounds the ported wall of the sleeve and intersects the passage 11. This arrangement insures ample flow through the ports 27 and associated passages. The inner edges of the ports 27 and 20 the valve seat 20 are substantially co-planar to likewise insure an unrestricted and ample flow when the valve member 21 is lifted from said seat.

In accordance with my invention a means is provided to hydraulically balance the valve so that it may be readily opened as desired without having to exert a force equal to the force of the hydraulic pressure which usually ranges between 1000 to 3000 pounds per square inch in hydraulic poppet valves as now generally used to control hydraulically responsive equipment in airplanes. This balancing means also affords a most effective guiding of the valve to insure reliable performance thereof and at the same time seals the ends of the seat member 12 and sleeve 23 respectively.

As here shown I provide for the balancing of the valve by means of a tubular piston-like member 29 on one side of the valve member 21 and a similar member 30 on the other side of the valve member, said piston-like members having diameters substantially equal to the diameter of the seat so that substantially equal hydraulic forces will be exerted on both sides or ends of the valve.

The piston-like member 29 is formed integral with or fixed to the outer face of the valve member 21 and has a sliding fit in an annular inturned flange 23a on the outer end of the sleeve 23. The portion 23a has an internal diameter less than that of the sleeve proper and affords a snug working fit for the piston-like member 29 which it is seen is extended outwardly beyond the outer end of the sleeve and serves as a socket for the spring 22. A sealing means 31 surrounds the member 29 and is seated in an annular recess 32 formed at the inner end of the cylinder portion 23a.

By having the member 29 of considerably less diameter than the inside diameter of the ported portion of the sleeve 23, a large annular space or passageway 23b is defined between the member 29 and the sleeve whereby to insure ample and unrestricted flow, when the valve member 21 is lifted from its seat.

The piston-like member 30 is carried on the end of a stem 33 projecting from the inner face of the valve member 21 into the bore of the seat member 12. This disposes the member 30 for a sliding fit in that portion of the bore of the seat member lying between the ports 18 and the innermost end of the seat member. Thus it is apparent the member 30 does not interfere with the flow through the seat member and ports 18, and seals the inner end of the seat member and acts as a valve guide. A sealing washer means 34 corresponding to the means 31 surrounds member 30 and is seated on the shoulder 35 in the bore 7. The inner end of the seat member abuts and holds the sealing means 34 in place.

The inner end of the member 30 extends into the reduced end portion 7b of the bore 7 and has a rounded projection 36 which protrudes into the bore 8 and is adapted to be engaged by a cam 37 on the cam shaft 9, so as to operate the valve member 21.

A passage 38 extends through the member 29, the valve member 21 and the member 30 so as to open into the inner and outer ends of the bore 7 and relieve fluid trapped in said ends during operation of the valve.

With reference to Fig. 2, it is seen that the valve member 21, member 29, stem 33, member 30 and projection 36 may be conveniently formed as an integral balanced valve unit to facilitate manufacturing and assembling operations.

As shown in Fig. 5, I may construct the valve assembly so that a somewhat unbalanced arrangement is provided whereby the hydraulic pressure may assist the spring 39 to seat the valve member 40. One way of accomplishing this is to use inner and outer piston-like members 41 and 42 of less diameter than that of the valve seat 43. However, any other arrangement of differential areas or diameters which will permit the fluid pressure to assist in seating the valve while also appreciably reducing the handle load, is deemed to be within the scope of my invention.

In all respects other than above noted the valve assembly shown in Fig. 5 is identical as to construction to the valve assembly shown in Figs. 1 and 2.

It should be noted that whether the valve is fully balanced, as shown in Fig. 1, or somewhat unbalanced, as shown in Fig. 5, there will be afforded an appreciable reduction in the handle loads as compared to poppet valves in which the valve members are held seated under the full or a substantial part of the high pressure fluid in the valve unit. This reduction in handle load makes for a quick, easy and fully responsive operation of the valve unit and insures accuracy of performance while at the same time permitting a higher lift of the valve than heretofore possible in the art.

I have found that I may use a cam lift of .093 inch which is about twice that found possible with pressure seated poppet valves as heretofore used. Moreover, the reduction of handle loads and the resultant higher valve lift make possible an appreciable reduction in the pressure drop usually encountered in poppet valves as heretofore used in the art.

An important feature of the invention whereby construction and assemblage of the parts is greatly facilitated resides in forming the valve member 21 and its associated piston-like guide members 29 and 30, stem 33 and cam engaging projection 36 as a unitary structure with the members 29 and 30 cylindrical, and forming the cylindrical bore of the seat member 12 and of the portion 23a of the sleeve 23 of diameters to afford a slidable guiding fit with the members 29 and 30. By this arrangement the valve member 21 is carried and guided by the seat member 12 and sleeve 23. Then by extending the inner piston-like guide member 30 beyond the inner end of the seat member 12 and into the inner end portion 7b of the bore 7 and encompassing it by the washer 34 a highly effective seal is afforded for the lower end of the bore of the seat member 12.

One of the advantages afforded by my balanced valve assembly is that a plurality of such valves may be efficiently embodied and operated in a 4-way control valve, such as the one shown diagrammatically in Fig. 3. The valve unit C has the valve assemblies A of my invention set up in a novel radial arrangement which forms the subject matter of an application for United States Letters Patent entitled "Radial 4-way valve," Serial No. 139,122, filed April 18, 1941.

Inasmuch as the valve C forms the subject matter of the aforesaid patent application and is here shown only for the purpose of illustrating a particular application of the present invention, it is deemed sufficient to point out that it embraces four of the valve assemblies of the present invention arranged in a body D, in such manner that they are operated by a single cam shaft E, and through the several passages F and lines G, H, J and K control the operation of a hydraulic jack L.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a balanced poppet valve, a tubular seat member having a port between its ends and a valve seat at its outer end, a sealing sleeve in axial alignment with and engaging said seat member and having a port adjacent said seat, a valve member associated with said seat, spring means urging said valve member towards its seat, piston-like members connected with the valve member and slidable in said sleeve and said seat member respectively, and sealing means apart from and encompassing the piston-like member associated with said seat member for sealing the inner end of said seat member.

2. In a balanced poppet valve, a tubular seat member having a port between its ends and a valve seat at its outer end, a sealing sleeve in axial alignment with and engaging said seat member and having a port adjacent said seat, an outwardly opening valve member associated with said seat, spring means urging said valve member towards its seat, piston-like members connected with the valve member and slidable in said sleeve and said seat member respectively, one of said piston-like members extending outwardly from the outer face of the valve member; a stem extending inwardly from said valve member and maintaining the other piston-like member clear of the port in said seat member, and sealing means for the inner end of said seat member apart from and encompassing the last named piston-like members.

3. In a balanced poppet valve, a tubular seat member having a port between its ends and a valve seat at its outer end, a sealing sleeve in axial alignment with and engaging said seat member and having a port contiguous with said seat, a valve member cooperating with said seat, spring means urging said valve member towards its seat, piston-like members connected with opposite sides of the valve member and being slidable in said sleeve and said seat member respectively, one of said piston-like members extending from one face of the valve member and a stem extending from the other face of said valve member and connected with the other piston-like member, said piston-like members and said valve seat being of substantially equal diameters, and sealing means for the inner end of said seat member apart from end encompassing the last named piston-like members.

4. In a balanced poppet valve, a tubular seat member having a port between its ends and a valve seat at its outer end, a sleeve engaging and being axially aligned with said seat member and having a port spaced outwardly from said valve seat, an outwardly opening valve member in said sleeve for cooperation with said valve seat to control the flow through the ports in said sleeve and said seat member, a piston-like member connected with and extending outwardly from said valve member and having a sliding fit in and closing the outer end portion of said sleeve, spring means associated with said piston-like member for urging said valve member towards its seat, a stem extending inwardly from said valve member past the port in said seat member, a piston-like member on the stem having a sliding fit in and closing the inner end portion of said seat member, and protruding beyond the inner end of said seat member, and sealing means encompassing the protruding portion of said last named piston-like member.

5. In a balanced poppet valve, a tubular seat member having a port between its ends and a valve seat at its outer end, a sleeve engaging and being axially aligned with said seat member and having a port spaced outwardly from said valve seat, an outwardly opening valve member in said sleeve for cooperation with said valve seat to control the flow through the ports in said sleeve and said seat member, a piston-like member connected with and extending outwardly from said valve member, and having a sliding fit in and closing the outer end portion of said sleeve, spring means associated with said piston-like member for urging said valve member towards its seat, a stem extending inwardly from said valve member past the port in said seat member, a piston-like member on the stem having a sliding fit in and closing the inner end portion of said seat member, and protruding beyond the inner end of said seat member, and sealing means encompassing the protruding portion of said last named piston-like member, said piston-like member and said seat being of substantially equal diameters.

6. In a balanced poppet valve, a valve body having a valve receiving bore therein and passages communicating with said bore at axially spaced points in the latter, a tubular seat member mounted in said bore and having a port between its ends registering with the innermost port in said bore and provided with a valve seat on its outer end, a sleeve mounted in said bore and engaging the outer end of and being axially aligned with said seat member and having a port adjacent said seat and registering with the outermost port in said bore, a cap removably mounted in the outer end of said bore and engaging the outer end of said sleeve, an outwardly opening valve member movable in said sleeve into and out of engagement with said valve seat, a piston-like member carried by and extending outwardly from said valve member and having a sliding fit in and closing the portion of said sleeve beyond the port therein, a spring between the cap and said piston-like member for urging said valve member towards its seat, a stem extending from said valve into said seat member beyond the port in the latter, a piston-like member on said stem having a sliding fit in and closing the portion of the seat member. between the port therein and the inner end of said seat member, said last named piston-like member extending beyond the inner end of said seat member, and sealing means encompassing the extended portion of said last named piston-like member and relative to which the latter is movable, there being a passage extending through said piston-like members, said valve member and said stem for relieving fluid trapped between the piston-like members and the outer ends of the bore.

7. In a balanced poppet valve, a tubular seat member having a port between its ends and a valve seat at its outer end, a sealing sleeve in axial alignment with and engaging said seat member and having a port contiguous with said seat, spring means urging said valve member towards its seat, piston-like members connected with opposite sides of the valve member and having a sliding fit in said sleeve and said seat member respectively, and sealing means for the inner end of said seat member encompassing said last named piston-like member and relative to which the latter is movable, there being a fluid passage extending axially through said valve member and said piston-like member for relieving fluid trapped beyond the outer ends of said piston-like members.

8. In a balanced poppet valve, a tubular seat member having a port between its ends and a valve seat at its outer end, a sealing sleeve in axial alignment with and engaging said seat member and having a port contiguous with said seat, spring means urging said valve member towards its seat, piston-like members connected with opposite sides of the valve member and having a sliding fit in said sleeve and said seat member respectively, there being a fluid passage extending axially through said valve member and said piston-like members for relieving fluid trapped beyond the outer ends of said piston-like members, said piston-like members being of substantially the said diameters as said valve seat whereby the hydraulic pressure on said valve will be substantially equal in all positions thereof, and means for sealing the inner end of said seat member encompassing and slidably contacting the piston-like member therein.

9. In a balanced poppet valve, a valve body having a cam shaft receiving bore and a valve assembly receiving bore leading from one side thereof and opening to said cam shaft receiving bore; a pair of axially spaced passages in said body communicating with said valve assembly receiving bore; a tubular valve seat member in said last named bore having a valve seat interposed between said passages, a spring pressed valve arranged to normally rest on said seat, a piston-like member carried by said valve slidably conforming to and guided in said valve seat member and projecting therefrom into the inner end portion of said valve assembly receiving bore, a cam engaging protrusion on said piston-like member extending into said cam shaft receiving bore, and means carried by the walls of said bore encompassing the projecting portion of said piston-like member for sealing the inner end of said valve seat member from said cam shaft receiving bore.

10. The structure called for in claim 9 together with a second piston-like guide member on said valve, said second piston-like member projecting from said valve into the outer portion of said valve assembly receiving bore, a guide sleeve therefor in said bore, and sealing means carried by said guide sleeve encompassing and contacting said second piston-like guide member.

11. In a poppet valve, a unitary valve element including a poppet valve member having a cylindrical tubular piston-like guide member extending from the outer side thereof, a stem projecting from the other side thereof, and a cylindrical piston-like guide member on the outer end of said stem, a cylindrical tubular valve seat member encompassing said stem and a portion of the guide member thereon to guide the latter, a sleeve encompassing and slidably receiving the tubular guide member to guide the latter, a valve body formed with a bore, means for collectively securing said valve seat member and said sleeve with the associated valve element in said bore, said valve body also having a cam shaft receiving bore to which the inner end of said first named bore opens, means carried by said valve body and encompassing said first named guide member and cooperating with the latter to seal the interior of said valve seat member from said last named bore, means carried by said sleeve encompassing and cooperating with said tubular guide member to seal the latter exteriorly, means for reciprocating said valve element, and means for directing fluid to and from opposite sides of said poppet valve member between said sealing means and through said valve seat member and its said sleeve.

12. In a valve having a valve body formed with a valve assembly receiving bore, axially spaced inlet and outlet passages communicating with said bore, and a cam shaft receiving bore to which the inner end of said first named bore opens, a cylindrical tubular open ended valve seat member seated in the inner end portion of said first named bore having side openings leading to one of said passages, a valve seat on the outer end of said seat member located between said passages, a cylindrical tubular open ended guide sleeve in the outer end portion of said first named bore formed with side openings leading to the other of said passages, and having an inturned marginal flange on its outer end, a cap screwed in the outer end of said first named bore extending over the open outer end of said sleeve, a poppet valve arranged to bear on said valve seat, a tubular cylindrical guide member on said valve extending through the outer end of said sleeve slidably engaged by the end flange on the latter, a spring in said guide member bearing between said cap and said valve to normally seat the latter, a sealing ring carried by said sleeve encompassing and contacting said guide member, a stem on the underside of said valve, a cylindrical guide member on said stem slidably engaging the lower portion of said valve seat member and protruding beyond the inner end of the latter into said cam shaft receiving bore, and a sealing ring carried in said first named bore at the inner end of said valve seat member encompassing and contacting the protruding portion of said last named guide member.

JACOB B. VAN DER WERFF.